UNITED STATES PATENT OFFICE.

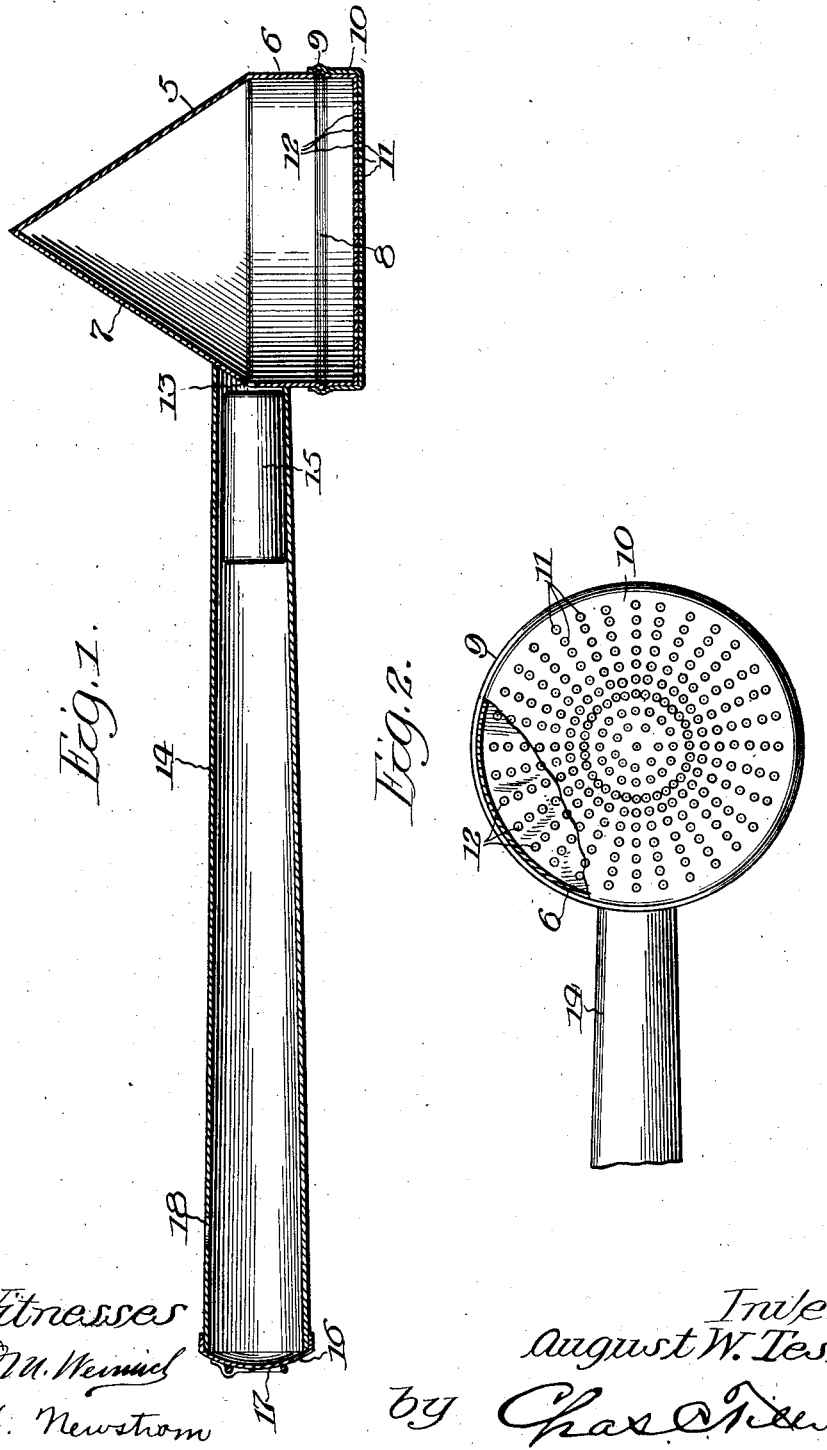

AUGUST W. TESCH, OF CHICAGO, ILLINOIS.

SELF-FEEDING SPRINKLER FOR CLOTHES.

1,038,025.  Specification of Letters Patent.  Patented Sept. 10, 1912.

Application filed July 20, 1911. Serial No. 639,503.

*To all whom it may concern:*

Be it known that I, AUGUST W. TESCH, a citizen of the United States, residing at Chicago, in the county of Cook and State of Illinois, have invented certain new and useful Improvements in Self-Feeding Sprinklers for Clothes, of which the following is a specification.

This invention relates to certain new and useful improvements in a device to be used for sprinkling clothes in the process of ironing the same, and it consists in certain peculiarities of the construction, novel arrangement, and operation of the various parts thereof, as will be hereinafter more fully set forth and specifically claimed.

The principal object of the invention is to provide a sprinkling device for clothes and the like, which shall be simple and inexpensive in construction, strong, durable, and efficient in operation, and so made that, when placed in a vessel, it will be automatically filled with water, which can be sprinkled or discharged from the device on to the clothes in minute particles or in spray-like form.

Another object of the invention is to so construct the device that it will be substantially non-leakable, until it is desired to discharge water therefrom.

Other objects and advantages of the invention will be disclosed in the subjoined description and explanation.

In order to enable others skilled in the art to which the invention pertains, to make and use the same, I will now proceed to describe it referring to the accompanying drawing in which—

Figure 1 is a longitudinal sectional view of a self feeding sprinkler embodying the invention, and Fig. 2 is a bottom plan view of the liquid holding receptacle and a portion of the handle of the device, showing a perforated cap secured on the lower portion of the receptacle, which cap is used to regulate the discharge of water from the receptacle as well as to close the same.

Like numerals of reference refer to corresponding parts throughout the different views of the drawing.

The reference numeral 5, designates a receptacle which may be made of any suitable size, form, and material, but preferably of sheet metal, and of the form shown in the drawing, that is, the lower portion 6 of the receptacle, is cylindrical in shape, and has projected upwardly therefrom a conical extension 7, the cavities of which communicate with one another. The lower portion 6, of the receptacle is provided with an annular bead 8, to engage a similar groove 9, on the inner surface of the walls of a cap 10, which is provided with perforations 11, to register with perforations 12, in the bottom of the receptacle, when it is desired that water may be discharged from the device. At about the juncture of the cone shaped extension 7, with the cylindrical portion 6, the receptacle 5, is provided with an opening 13, of any suitable size, which opening is encompassed by one end of the handle 14, which is hollow and secured at said end to the receptacle 5, in any suitable manner.

Within the handle 14, near the receptacle 5, is located a weight 15, which may be held in place by solder or otherwise, and is used for the purpose of causing the device to be submerged when placed in a vessel of liquid so that the same may pass through the perforations 11, and 12, into the receptacle 5, thus causing it to be automatically filled. The opposite end of the handle 14, from that to which the receptacle 5, is connected, is provided with a cap 16, which may have a ring 17, thereon, to be used for hanging the device up on a nail. The handle 14, is provided near its outer end with an opening 18, which will admit air to the cavity of the handle and through the opening 13, to the receptacle 5.

The cap 10 is rotatably mounted on the portion 6, of the receptacle 5, so that the perforations 11, in said cap can be caused to register with the openings 12, in the bottom of the receptacle, so as to allow the water to be sprinkled from said receptacle, which can be done by moving the receptacle downwardly and suddenly stopping the same, in which operation it is apparent that the water will be forced through said openings or perforations in small quantities or in spray-like form.

By placing the hand on the handle 14, so as to close the opening 18, it is evident that air will be prevented passing into the handle, and that the liquid will be held in the receptacle by reason of the vacuum therein, until the device is moved and suddenly stopped, or until the portion of the hand over the opening 18, is removed therefrom. By turning the cap 10, on the portion 6, it is evident that the openings 11, may be caused to partially register with the openings 12, in the bottom of the receptacle, thus diminishing the quantity of water discharged through said openings, or if it is desired the cap 10, may be turned so that its perforations will be entirely out of register with the perforations 12, in the bottom of the receptacle, when it is apparent that the vessel will be closed so that water cannot be discharged therefrom.

Having thus fully described my invention what I claim as new and desire to secure by Letters-Patent is—

A self feeding sprinkler for clothes consisting of a receptacle contracted toward one of its ends and having perforations in its opposite end, a hollow handle secured to the side wall of the receptacle at a point spaced from each of its ends but nearer the perforated end and having communication therewith, said handle having near its outer end a vent opening, and a weight located in the handle near the vessel.

AUGUST W. TESCH.

Witnesses:
CHAS. C. TILLMAN,
E. NEWSTROM.

Copies of this patent may be obtained for five cents each, by addressing the "Commissioner of Patents, Washington, D. C."